(12) United States Patent
Chen

(10) Patent No.: US 11,867,215 B2
(45) Date of Patent: Jan. 9, 2024

(54) SELF DRILLING BOLT AND NUT

(71) Applicant: Ami Chen, Harish (IL)

(72) Inventor: Ami Chen, Harish (IL)

(73) Assignee: Ami Chen, Harish (IL)

( * ) Notice: Subject to any disclaimer, the term of this patent is extended or adjusted under 35 U.S.C. 154(b) by 497 days.

(21) Appl. No.: 17/043,918

(22) PCT Filed: Mar. 29, 2019

(86) PCT No.: PCT/IL2019/050371
§ 371 (c)(1),
(2) Date: Sep. 30, 2020

(87) PCT Pub. No.: WO2019/193588
PCT Pub. Date: Oct. 10, 2019

(65) Prior Publication Data
US 2021/0018031 A1    Jan. 21, 2021

(30) Foreign Application Priority Data
Apr. 1, 2018  (IL) .......................................... 258480

(51) Int. Cl.
*F16B 25/10*     (2006.01)
*F16B 25/00*     (2006.01)
*F16B 37/08*     (2006.01)

(52) U.S. Cl.
CPC ........ *F16B 25/103* (2013.01); *F16B 25/0084* (2013.01); *F16B 37/085* (2013.01); *F16B 25/10* (2013.01)

(58) Field of Classification Search
CPC ...... F16B 25/00; F16B 25/0084; F16B 25/10; F16B 25/103; F16B 37/085; F16B 37/00;
(Continued)

(56) References Cited

U.S. PATENT DOCUMENTS 647,953 A  *  4/1900  Ferriott ..................... B60B 1/00
                                                411/437
2,896,495 A  *  7/1959  Crawford .............. F16B 37/002
                                                411/437
(Continued)

FOREIGN PATENT DOCUMENTS

EP       2143963 A1    1/2010
EP     3 199 824 A1    8/2017
(Continued)

OTHER PUBLICATIONS

Extended International Search Report from European appln. 19780715.9 dated Nov. 19, 2021.
(Continued)

*Primary Examiner* — Roberta S Delisle
(74) *Attorney, Agent, or Firm* — SNELL & WILMER L.L.P.

(57) ABSTRACT

A drilling bolt-and-nut assembly for attaching rigid panels, including a drilling bolt and a grooved nut. The drilling bolt includes a cylindrical screw-thread section, an external thread-diameter, and an internal thread-diameter; a drill-bit section; and a thread-less section interconnecting the screw-thread section, the drill-bit section. The grooved nut has a through cylindrical opening formed at the center of the nut, wherein the cylindrical wall of the cylindrical opening of the grooved nut is threaded with threads that are operatively compatible with the threads of the drilling bolt. The drill-bit section includes at least two cutting-blades, wherein the at least two cutting-blades are spaced apart. At least two grooves are formed in the wall of the through cylindrical opening, wherein the grooves are spaced apart similar to the peripheral distance between the cutting-blades of the drill bit-section.

9 Claims, 7 Drawing Sheets

(58) Field of Classification Search
CPC ... F16B 37/0842; F16B 37/0857; F16B 37/14
USPC ............... 411/386, 387.1, 387.6, 387.8, 427, 411/435–437
See application file for complete search history.

(56) References Cited

U.S. PATENT DOCUMENTS

| | | | | |
|---|---|---|---|---|
| 3,500,713 | A * | 3/1970 | Walter | F16B 25/0031 411/387.2 |
| 4,826,379 | A * | 5/1989 | Norden | F16B 37/0842 411/908 |
| 4,880,343 | A * | 11/1989 | Matsumoto | F16B 39/12 411/303 |
| 5,139,380 | A * | 8/1992 | Reynolds | F16B 37/02 411/937.1 |
| 7,090,452 | B2 * | 8/2006 | Chen | F16B 25/0089 411/387.1 |
| 8,662,806 | B2 * | 3/2014 | Gillis | F16B 13/003 411/57.1 |
| 2007/0134072 | A1 * | 6/2007 | Su | F16B 25/103 411/387.1 |
| 2010/0119327 | A1 * | 5/2010 | Lin | F16B 25/103 411/387.8 |
| 2011/0255936 | A1 * | 10/2011 | Stager | F16B 25/0021 411/387.1 |
| 2012/0014764 | A1 * | 1/2012 | Davidson | F16B 37/002 411/437 |
| 2015/0147138 | A1 * | 5/2015 | Hsieh | F16B 39/28 411/436 |

FOREIGN PATENT DOCUMENTS

FR          2 083 148 A5      12/1971
WO       2012/095479 A1       7/2012

OTHER PUBLICATIONS

International Search Report from PCT/IL2019/050371 dated Jul. 10, 2019.

* cited by examiner

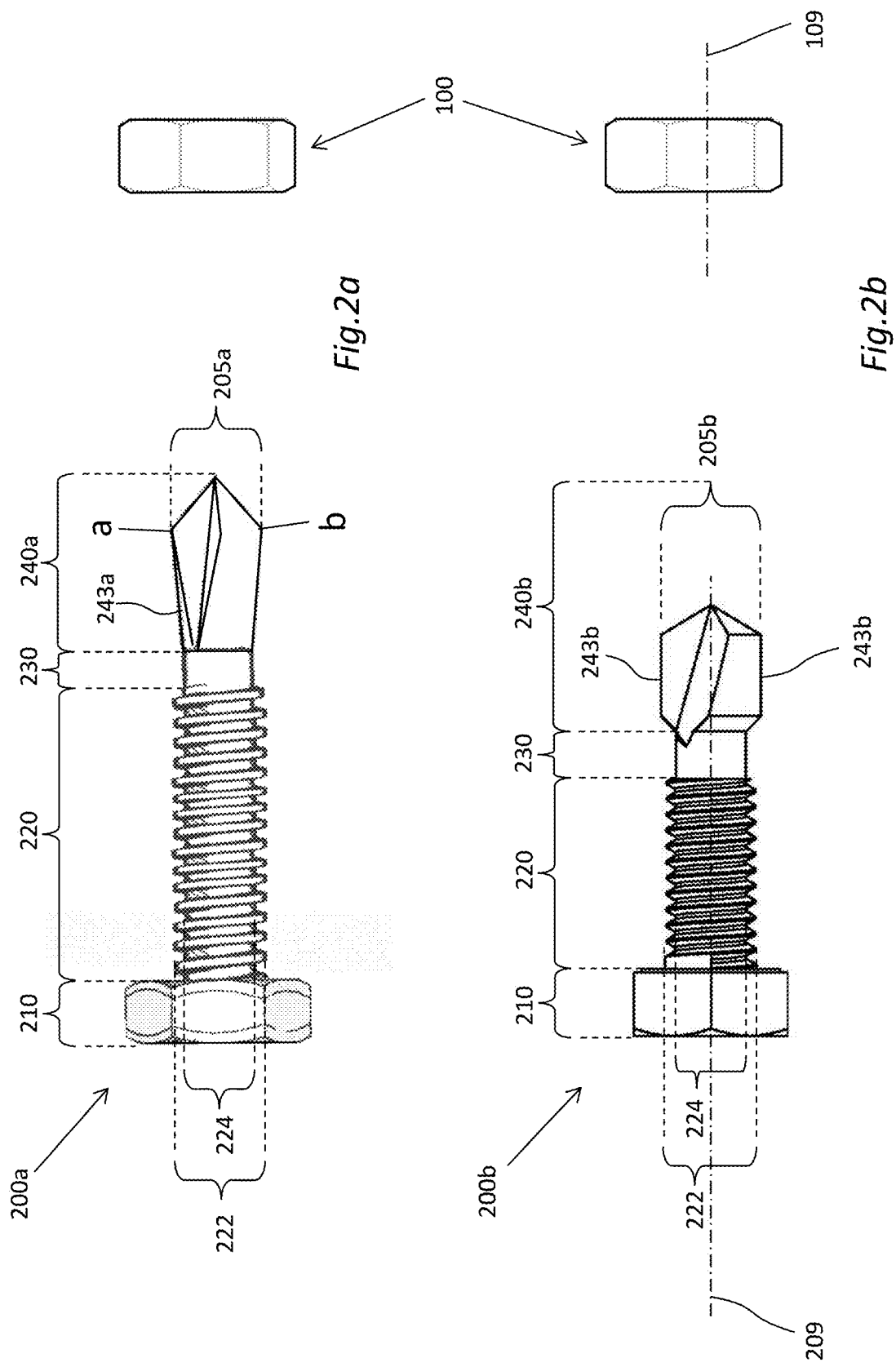

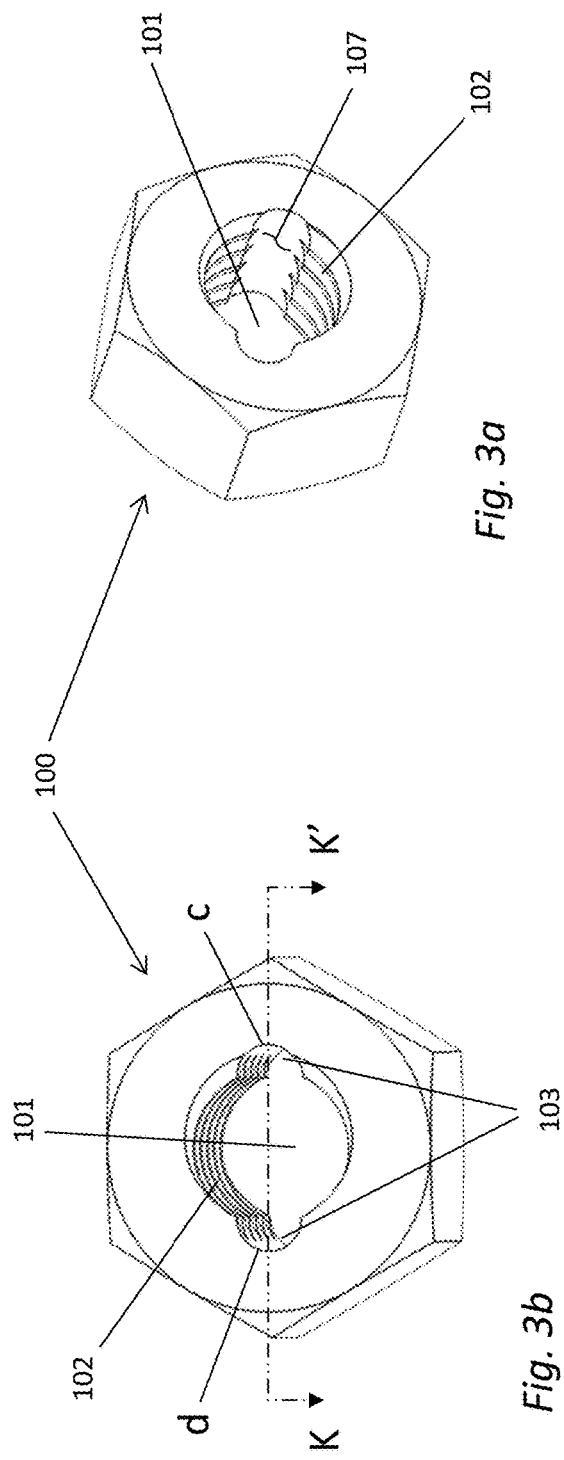
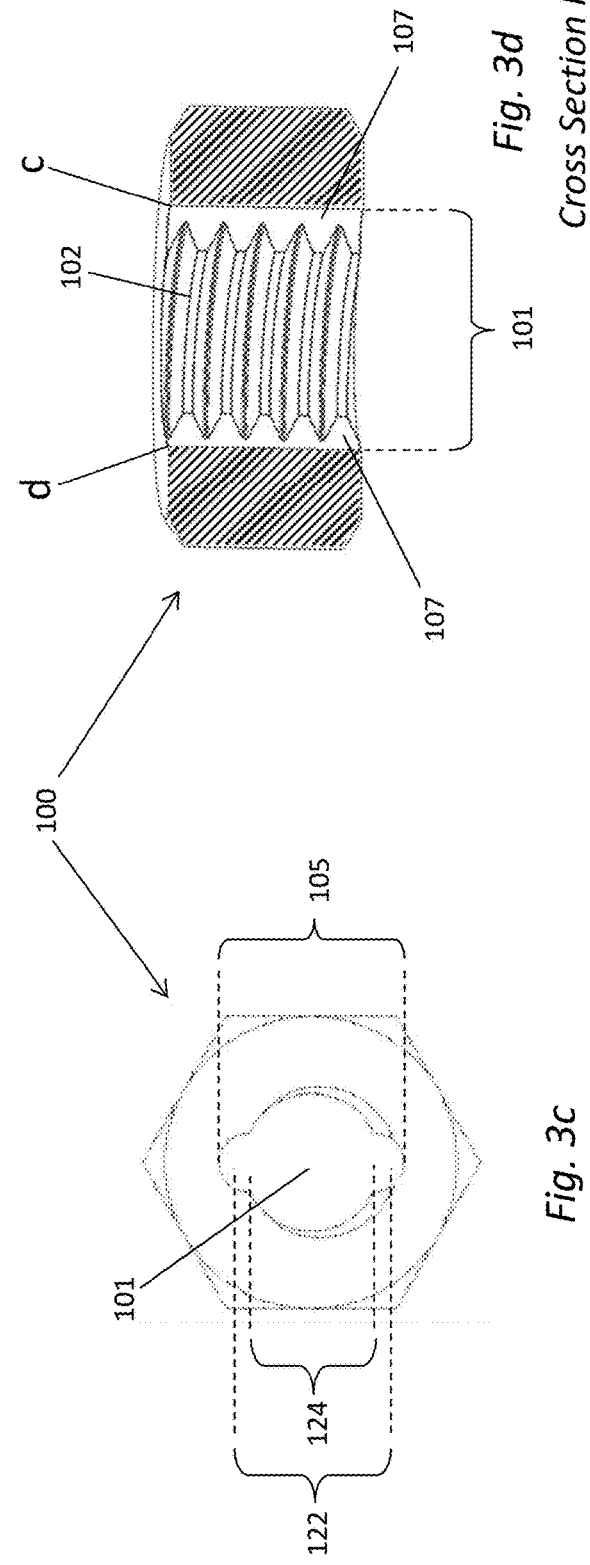

SELF DRILLING BOLT AND NUT

FIELD OF THE INVENTION

A self-drilling bolt assembly for attaching rigid panels having a self-drilling bolt and a grooved nut for allowing the drilling, bolting and tightening operations to be performed in one operational session, without having to use two drivers, and thus reducing installation time.

BACKGROUND OF THE INVENTION AND PRIOR ART

Bolts and compatible nuts are commonly used to tightly attach two or more solid items. Tightening together rigid panels such as, with no limitations, aluminum panels, using bolts and compatible nuts, is a very common task taking place during construction of a new building especially in large buildings such as high-rise buildings. FIG. 1 illustrates a common bolt-and-nut assembly having a cylindrical bolt 60 and a matching nut 50, used to tighten an item 12 and an item 14 together. Bolt 60 includes a bolt-head 62 configured to operatively interface with a screwdriver; and a cylindrical screw-thread section 64, configured to operatively interface with matching internal threads of nut 50, to tighten items 12 and 14 together.

The time-consuming factor in assembly operations of rigid panels performed during constructions of modern buildings is essential. During construction of a new building, a large number of bolts and nuts are commonly used to tighten together rigid panels. Installing a bolt requires an operation of a drilling equipment to drill a hole through the rigid panels, withdraw the drilling equipment including the drill-bit and put the drilling equipment aside, fit a right bolt through the formed through hole, place a suitable nut 50 onto the open end of the screw-thread section 64 of cylindrical bolt 60, pick up a screwdriver and, finally, tighten nut 50 against bolt-head 62 of bolt 60 and put the screwdriver aside.

Among the disadvantages of this known system is the time factor that reduces the efficiency of the operation with a resulting increase in its cost when dealing with the installation of large quantities of parts, for example, in buildings.

It is an object of the present invention to provide a bolt and nut assembly allowing the drilling and tightening operations to be performed in one operational session, without having to use two drivers, and thus reducing installation time.

SUMMARY OF THE INVENTION

According to the teachings of the present invention there is provided a self-drilling bolt-and-nut assembly for attaching rigid panels, including a self-drilling bolt and a grooved nut.

The self-drilling bolt includes a bolt-head configured to operatively interface with a driver tool; a cylindrical screw-thread section having a bolt-rotating-axis, an external thread-diameter, and an internal thread-diameter; a drill-bit section; and a thread-less section interconnecting the screw-thread section, having a thread-less section width, and the drill-bit section.

The grooved nut has a through cylindrical opening formed at the center of the grooved nut, the cylindrical opening having a nut-rotating-axis, wherein the cylindrical wall of the cylindrical opening of the grooved nut is threaded with threads that are operatively compatible with the threads of the screw-thread section of the self-drilling bolt, and wherein the threads of the grooved nut form the through cylindrical opening.

The bolt-rotating-axis operatively coincides with the nut having a nut-rotating-axis.

The drill-bit section includes at least two cutting-blades, wherein the at least two cutting-blades are spaced apart, and wherein the drill-bit section has a width that is twice the distance of the cutting-blades from the bolt-rotating-axis.

The thread-less section width is equal to or smaller than the internal diameter of the cylindrical screw-thread section.

The width of the cutting-blades is equal to or slightly larger than the external thread-diameter of the screw-thread section.

At least two grooves, each having a groove-depth, are formed in the wall of the through cylindrical opening, wherein the grooves are parallel to the nut-rotating-axis, and wherein the grooves are spaced apart similar to the peripheral distance between the cutting-blades of the drill-bit section.

The grooves locally widen the through cylindrical opening by twice the depth of the groove-depth, to thereby form a local-maximum-cylindrical-opening.

The local-maximum-cylindrical-opening is equal to or slightly wider than the width of the drill-bit section, to thereby enable the grooved nut to pass through the drill-bit section of the self-drilling bolt and reach the thread-less section of the self-drilling bolt and then to the cylindrical screw-thread of the self-drilling bolt.

Optionally, the drill-bit section has a cylindrical shape.

Optionally, the drill-bit section has a conical shape.

Optionally, the self-drilling bolt-and-nut assembly further including a washer.

Optionally, the cutting-blades have flat edges.

Optionally, the cutting-blades have twisted edges.

Optionally, the self-drilling bolt is drilled and bolted by a power driver.

According to the teachings of the present invention there is provided rigid panels attaching method including the steps of: providing a self-drilling bolt-and-nut assembly as described here above; drilling the self-drilling bolt through at least two panels, at preconfigured locations; passing the grooved nut over the drill-bit section, wherein the cutting-blades pass through the matching grooves formed in the wall of the through cylindrical opening; passing the grooved nut over the thread-less section; and tightly screwing the grooved nut onto the cylindrical screw-thread section of the self-drilling bolt.

Optionally, a washer is placed through the cylindrical screw-thread section of the self-drilling bolt, before the drilling of the self-drilling bolt through the at least two panel.

BRIEF DESCRIPTION OF THE DRAWINGS

FIG. 2a is a side view illustration of a self-drilling bolt-and-nut assembly having a self-drilling bolt and a matching grooved nut, according to some embodiments of the present invention, wherein the drill-bit section of the self-drilling bolt has a conical shape.

FIG. 2b is a side view illustration of a self-drilling bolt-and-nut assembly having a self-drilling bolt and a matching grooved nut, according to some embodiments of the present invention, wherein the drill-bit section of the self-drilling bolt has a cylindrical shape.

FIGS. 3a and 3b are perspective view illustrations of a grooved nut, according to some embodiments of the present invention.

FIG. 3c is a front view illustration of the grooved nut as shown in FIGS. 3a and 3b.

FIG. 3d is a side, cross section view illustration of the grooved nut as shown in FIGS. 3a and 3b.

DETAILED DESCRIPTION OF THE PREFERRED EMBODIMENTS

Figure 1:
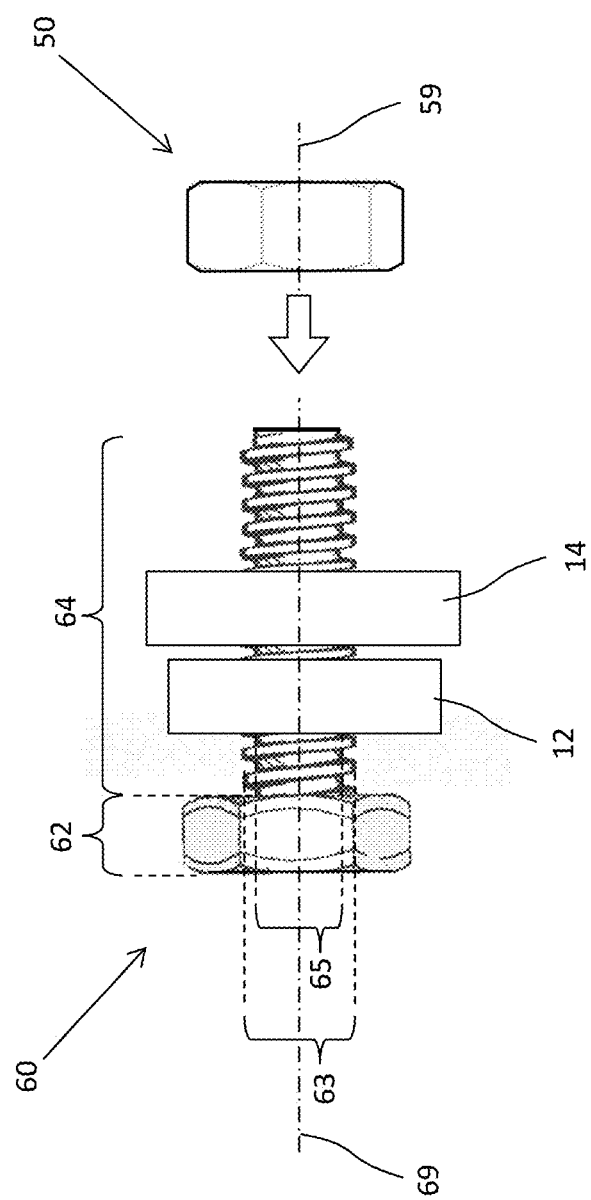
FIG. 1 is a side view illustration of a common cylindrical bolt and a matching nut, used to tighten two solid items together.

FIGS. 2a and 2b are side exploded view illustrations of self-drilling bolt-and-nut assemblies having a self-drilling bolt 200 and a matching grooved nut 100, according to some embodiments of the present invention. The self-drilling bolt-and-nut assemblies are configured for tightly attaching a pair (or more) of rigid panels, performed in a single drilling and bolting session using a single driver tool, typically a power driver.

Bolts 200 includes a bolt-head 210 configured to operatively interface with a driver such as a screwdriver, a cylindrical screw-thread section 220 having a bolt-rotating-axis 209, a drill-bit section 240, and a cylindrical thread-less section 230 interconnecting screw-thread section 220 and drill-bit section 240.

Screw-thread section 220 has an external diameter 222 and a threads-internal diameter 224, wherein external diameter 222 is wider than threads-internal diameter 224. Furthermore, the diameter of external diameter 222 defines the minimal size hole required to accommodate screw-thread section 220 of self-drilling bolts 200. Furthermore, the width of cylindrical thread-less section 230 width is equal to or smaller than the internal diameter 224 of cylindrical screw-thread section 220.

Drill-bit section 240 may have a conical shape, as shown in FIG. 2a, or a cylindrical shape, as shown in FIG. 2b, wherein drill-bit section 240 includes cutting-blades 243 having, with no limitations, flat edges. However, cutting-blades 243 may have twisted edges. Typically, the drill-bit section 240 includes 2 (two) cutting-blades 243, and the present invention is described, with no limitations, as having 2 (two) cutting-blades 243, but the drill-bit section 240 of the present invention may have any number, one or more, of cutting-blades 243.

The maximal distance 205 between the two cutting-blades 243 defines the diameter of the hole drilled by self-drilling bolts 200. It should be noted that since the hole drilled must be equal to or slightly larger than the external diameter 222 of screw-thread section 220, maximal distance 205 is equal to or slightly larger than the external diameter 222.

Reference is also made to FIGS. 3a, 3b, 3c and 3d, showing grooved nut 100 in perspective views and a cross section side view (FIG. 3d). Grooved nut 100 has a cylindrical opening 101 formed at the center of the grooved nut (100), wherein the cylindrical wall of cylindrical opening 101 of grooved nut 100 is threaded with threads 102 having diameters that are operatively compatible with the screw-thread section 220 of self-drilling bolts 200. Hence, the smaller diameter of threads 102 of grooved nut 100 match the threads-internal diameter 124 of self-drilling bolts 200, wherein the smaller diameter of threads 102 of grooved nut 100 define the diameter of inner opening of cylindrical opening 101 of grooved nut 100.

Hence, since the inner opening of cylindrical opening 101 of grooved nut 100 is similar to the diameter of threads-internal diameter 224 of screw-thread section 220 that is narrower than the diameter of external diameter 222, the inner opening of cylindrical opening 101 of grooved nut 100 is also narrower than the maximal distance 205 between the two cutting-blades 243. Therefore, this creates a problem in the form of the inability of drill-bit section 240 to pass through inner opening of cylindrical opening 101 of grooved nut 100, to thereby prevent grooved nut 100 to reach screw-thread section 220 of self-drilling bolts 200.

Figure 4A:
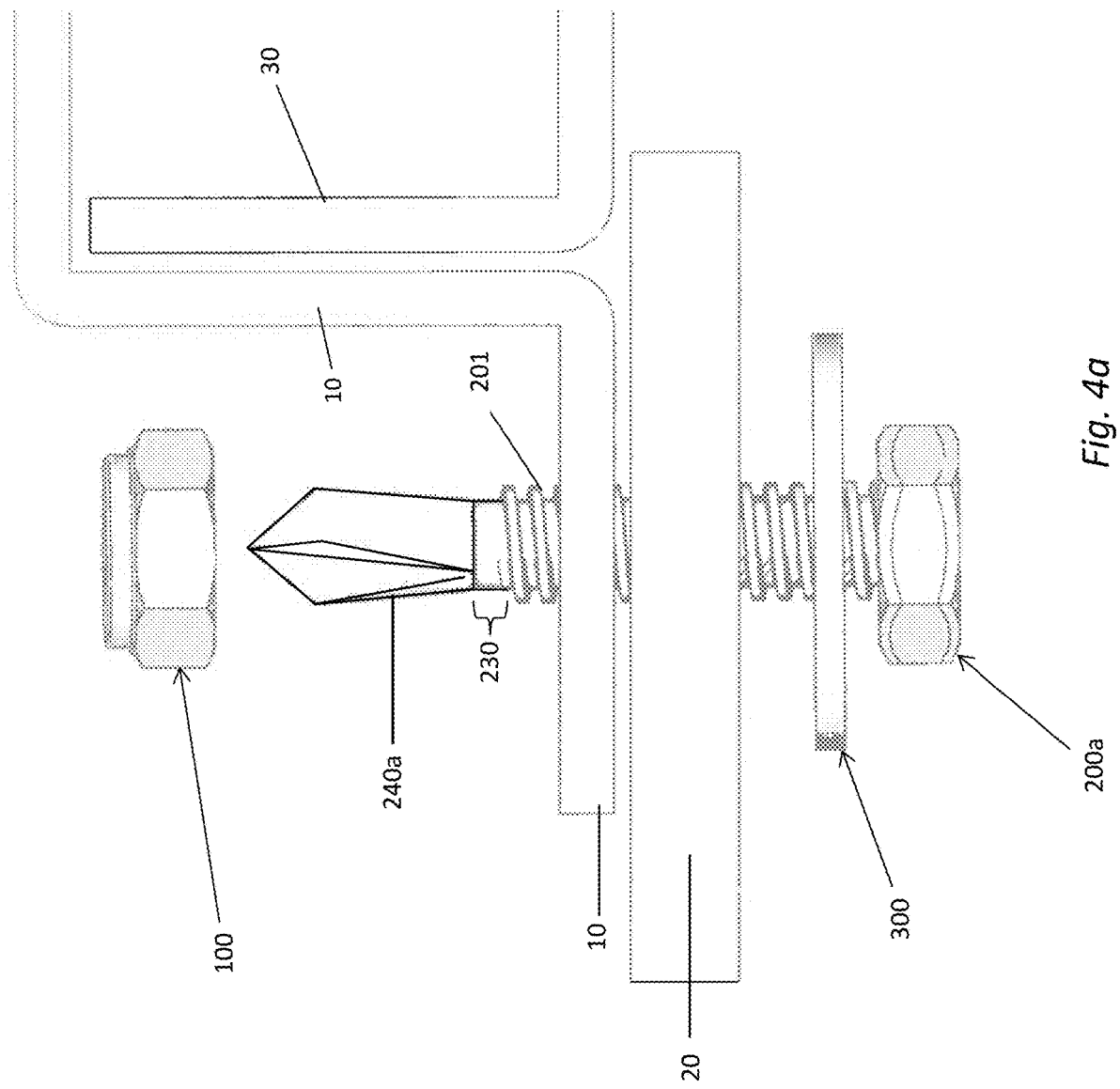
FIG. 4a is a schematic illustration showing a self-drilling bolt penetrating 2 rigid panels, and a coupled grooved nut, wherein the nut is shown in a side natural view.

FIG. 4a illustrates a self-drilling bolt 200a penetrating 2 rigid panels (10 and 20) and a coupled grooved nut 100. After the hole in rigid panels 10 and 20 has been formed, the screw-thread section 220 of self-drilling bolts 200 follows through the formed through hole, wherein the tip end of drill-bit section 240 faces grooved nut 100.

Grooved nut 100, as may be seen in FIGS. 3a-3d, has cylindrical opening 101 formed there at the center, wherein the wall of cylindrical opening 101 is threaded with screw-thread 102, as described here above. Cylindrical opening 101 has a nut-rotating axis 109 that operatively coincides with bolt-rotating-axis 209. In order to allow cutting-blades 243 to pass through cylindrical opening 101, grooves 107 are formed in the wall of cylindrical opening 101, wherein the grooves 107 are parallel to nut-rotating axis 109. The grooves 107 are spaced apart similar to the peripheral distance between cutting-blades 243 of drill-bit section 240.

Figure 4B:
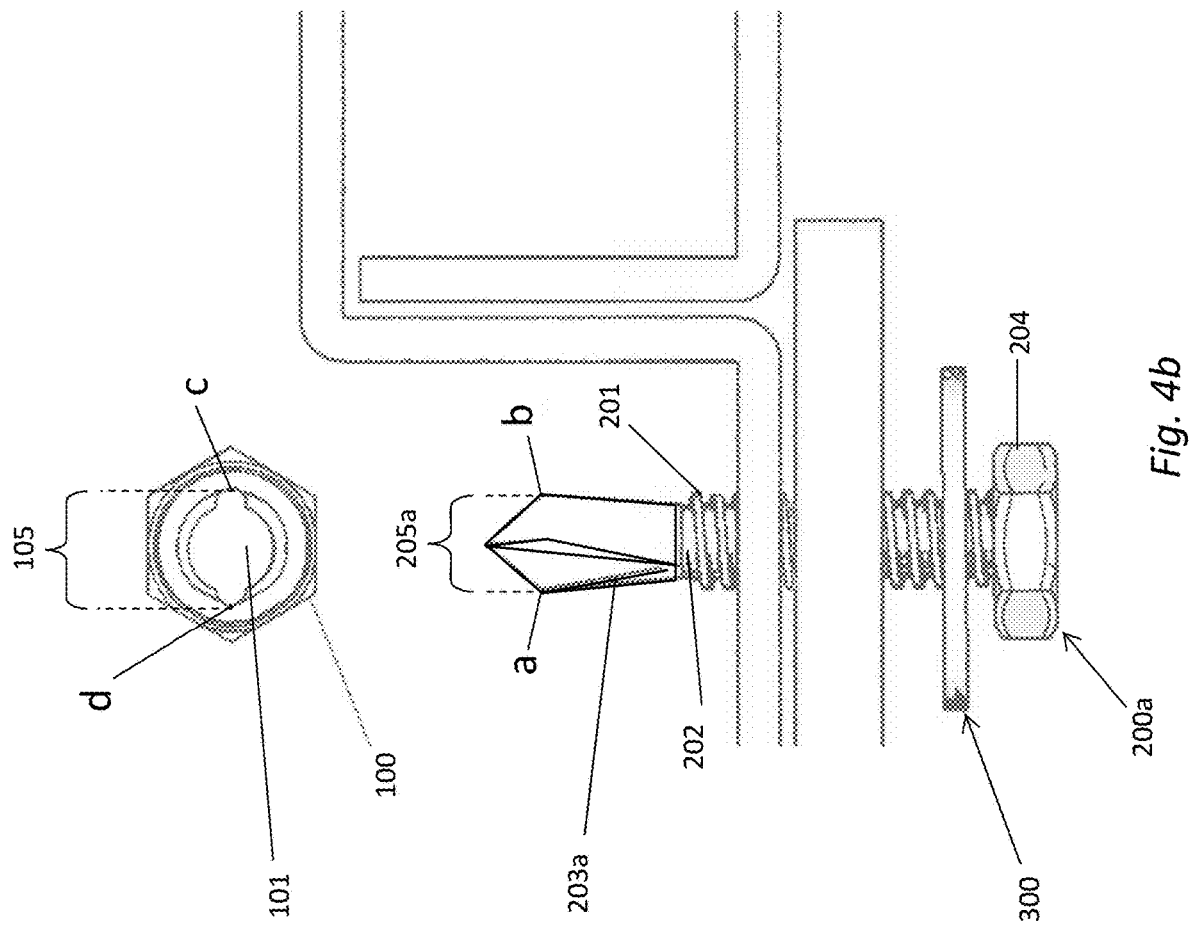
FIG. 4b is a schematic illustration showing a self-drilling bolt penetrating 2 rigid panels, and a coupled grooved nut, wherein the nut is shown in a front view, for illustrative purposes only.

In the example shown in FIGS. 3a-3d and FIG. 4a, there are 2 cutting-blades 243 and 2 grooves 107, wherein the depth of grooves 107 is such that the opening 105 formed between the two grooves 107 is greater than or equal to the maximal distance 205 between the two cutting-blades 243. As such, drill-bit section 240 can now pass through cylindrical opening 101 of grooved nut 100, wherein the 2 cutting-blades 243 pass through the 2 grooves 107, such that drill bit edges a & b pass proximal to points c & d (see FIG. 4b).

Figure 4C:
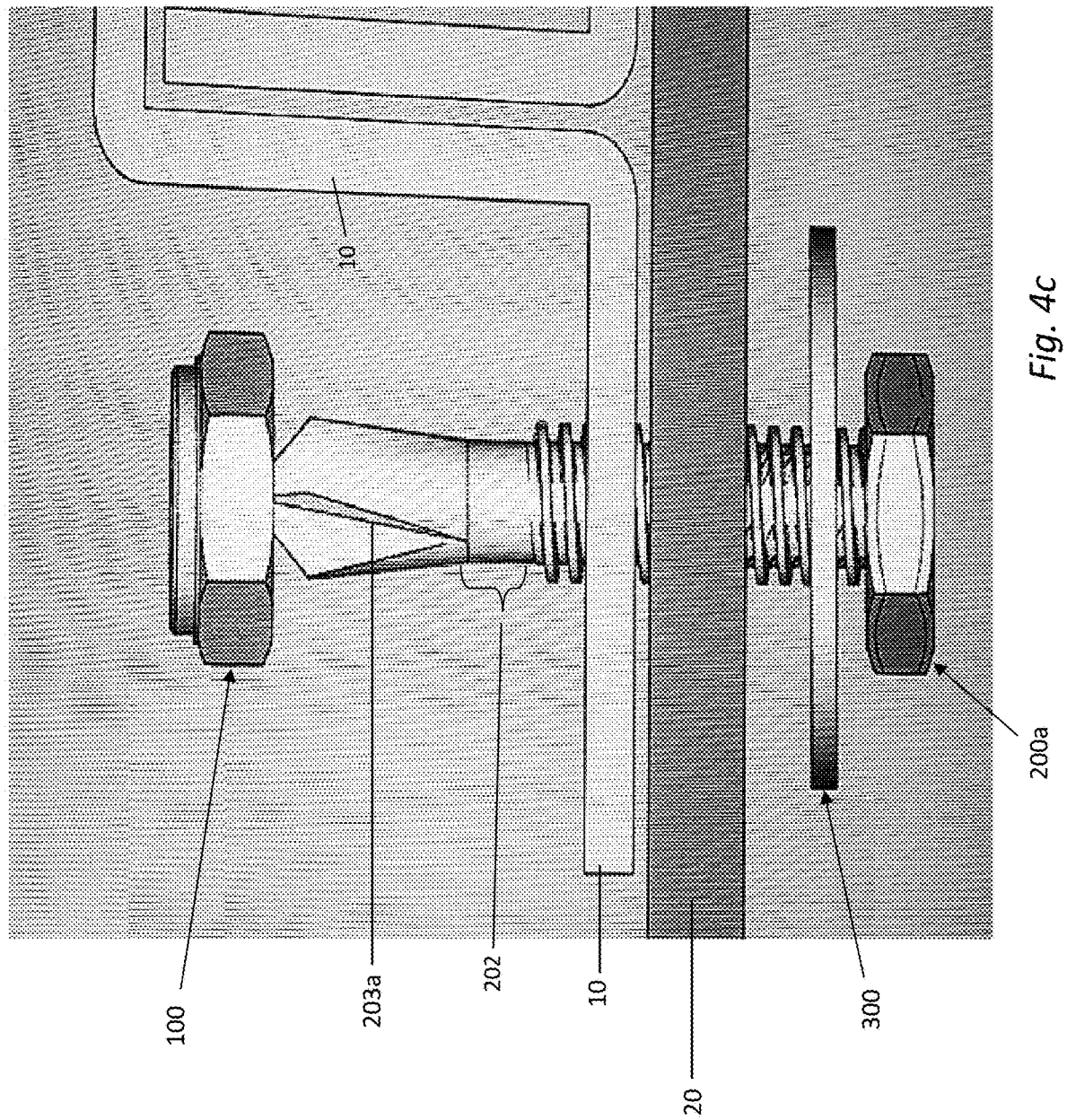
FIG. 4c is a schematic illustration showing a self-drilling bolt penetrating 2 rigid panels, and a coupled grooved nut, wherein the nut is shown placed over the tip of the drill-bit section.

As may also be seen in FIG. 4c, once grooved nut 100 passes through drill-bit section 240 it reaches thread-less section 230. At thread-less section 230 grooved nut 100 may rotate freely such that the thread-end of threads 102 of grooved nut 100 can meet the thread-end of screw-thread section 220 of self-drilling bolts 200, thereby facilitating grooved nut 100 to screw onto the screw-thread section 220 of self-drilling bolts 200 and thereby tighten together panels 10 & 20. Optionally, a washer 300 is disposed between bolt-head 210 and the proximal panel.

Figure 5:
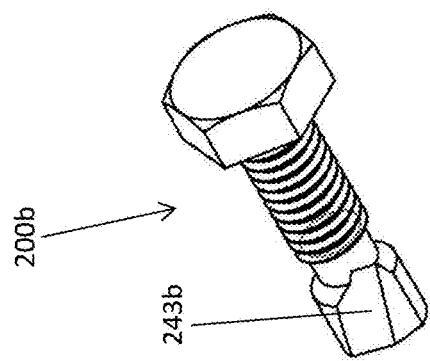
FIG. 5 is a perspective view illustration of the self-drilling bolt shown in FIG. 2b.
Figure 6C:
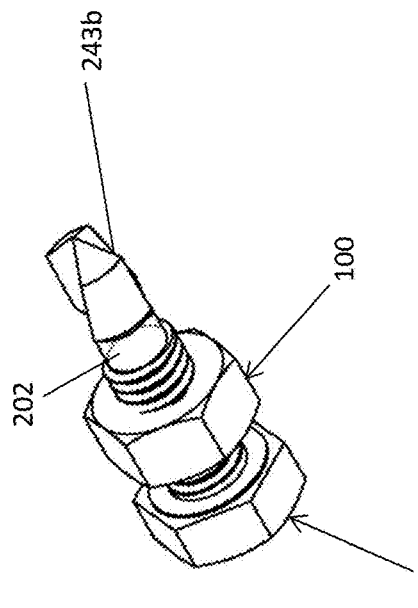
FIG. 6c is a perspective view illustration of the self-drilling bolt, shown from the tip of the drill-bit section, wherein the grooved nut is adapted to screw onto the screw-thread section.
Figure 6A:
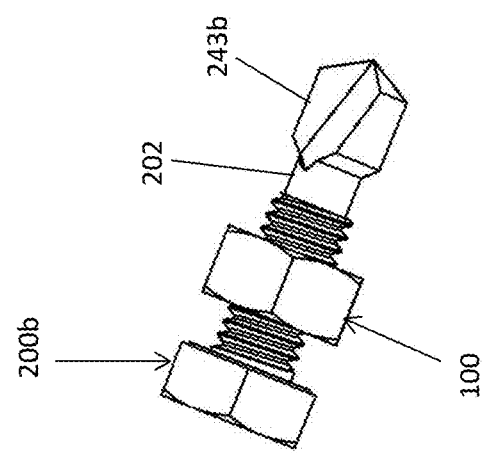
FIG. 6a is a side view of the self-drilling bolt with the grooved nut in an assembled position.
Figure 6B:
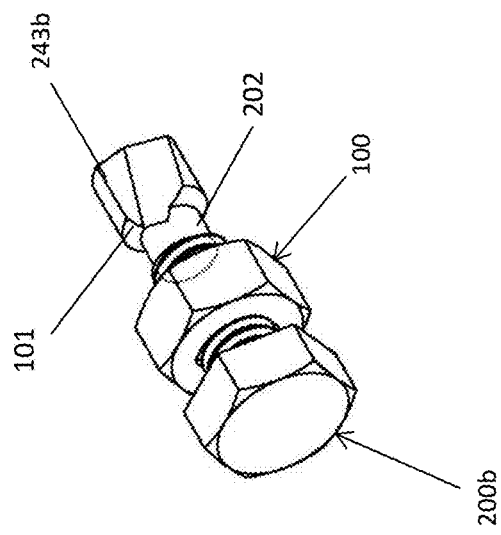
FIG. 6b is a perspective view illustration of the self-drilling bolt, shown from the bolt head side, wherein the grooved nut is adapted to screw onto the screw-thread section.

FIG. 5 of the drawings is a perspective view illustration of self-drilling bolt 200b. FIG. 6a is a side view illustration of self-drilling bolt 200b, wherein grooved nut 100 is adapted to screw onto the screw-thread section 220. FIG. 6b of the drawings is a perspective view illustration of self-drilling bolt 200b, shown from bolt head side, wherein grooved nut 100 is adapted to screw onto the screw-thread section 220. FIG. 6c is a perspective view illustration of self-drilling bolt 200b, shown from the tip of drill-bit section 240, wherein grooved nut 100 screws onto screw-thread section 220.

The invention being thus described in terms of embodiments and examples, it will be obvious that the same may be varied in many ways. Such variations are not to be regarded as a departure from the spirit and scope of the invention, and all such modifications as would be obvious to one skilled in the art are intended to be included within the scope of the claims.

The invention claimed is:

1. A self-drilling bolt-and-nut assembly for attaching rigid panels, comprising:
   a self-drilling bolt comprising:
      a bolt-head configured to operatively interface with a driver tool;
      a cylindrical screw-thread section having a bolt-rotating-axis, an external thread-diameter, and an internal thread-diameter;
      a drill-bit section; and
      a thread-less section interconnecting said screw-thread section, having a thread-less section width, and said drill-bit section; and
   a grooved nut having a through cylindrical opening formed at the center of said grooved nut, said cylindrical opening having a nut-rotating-axis, wherein the cylindrical wall of said cylindrical opening of said grooved nut is threaded with threads that are operatively compatible with the threads of said screw-thread section of said self-drilling bolt, and wherein said threads of said grooved nut form said through cylindrical opening;
   wherein said bolt-rotating-axis operatively coincides with said nut having a nut-rotating-axis;
   wherein said drill-bit section includes at least two cutting-blades, wherein said at least two cutting-blades are spaced apart, and wherein said drill-bit section has a width that is twice the distance of said cutting-blades from said bolt-rotating-axis;
   wherein said width of said cutting-blades is equal to or slightly larger than said external thread-diameter of said screw-thread section;
   wherein said thread-less section width is equal to or smaller than said internal diameter of said cylindrical screw-thread section; and
   wherein at least two grooves, each having a groove-depth, are formed in said wall of said through cylindrical opening, wherein said grooves are parallel to said nut-rotating-axis;
   wherein said grooves are spaced apart according to a peripheral distance between said cutting-blades of said drill-bit section;
   wherein said grooves locally widen said through cylindrical opening by twice the depth of said groove-depth to thereby form a local-maximum-cylindrical-opening; and
   wherein said local-maximum-cylindrical-opening is equal to or slightly wider than said width of said drill-bit section to thereby enable said grooved nut to pass through said drill-bit section of said self-drilling bolt and reach said thread-less section of said self-drilling bolt and then to said cylindrical screw-thread of said self-drilling bolt.

2. The assembly of claim 1, wherein said drill-bit section has a cylindrical shape.

3. The assembly of claim 1, wherein said drill-bit section has a conical shape.

4. The assembly of claim 1, further comprising a washer.

5. The assembly of claim 1, wherein said cutting-blades have flat edges.

6. The assembly of claim 1, wherein said cutting-blades have twisted edges.

7. The assembly of claim 1, wherein said self-drilling bolt is drilled and bolted by a power driver.

8. A rigid panels attaching method comprising the steps of:
   providing a self-drilling bolt-and-nut assembly as defined in claim 1;
   driving said self-drilling bolt through at least two panels, at preconfigured locations;
   passing said grooved nut over said drill-bit section, wherein said cutting-blades pass through said matching grooves formed in said wall of said through cylindrical opening;
   passing said grooved nut over said thread-less section; and
   tightly screwing said grooved nut onto said cylindrical screw-thread section of said self-drilling bolt.

9. The method of claim 8, further comprising: placing a washer through said cylindrical screw-thread section of said self-drilling holt, before said drilling of said self-drilling bolt through the at least two panels.

* * * * *